United States Patent [19]
Alimpich et al.

[11] Patent Number: 5,872,568
[45] Date of Patent: Feb. 16, 1999

[54] APPLICATION AND METHOD FOR CREATING A LIST FROM PRE-DEFINED AND USER VALUES

[75] Inventors: Claudia C. Alimpich; Joan Stagaman Goddard, both of Boulder; Deborah Elizabeth Neuhard, Longmont; Cheryl Steinmeyer, Franktown, all of Colo.; Minh Trong Vo, Mountain View, Calif.; James Philip Wittig, Boulder; Rachel Youngran Yang, Superior, both of Colo.

[73] Assignee: International Business Machines Corporation, Armonk, N.Y.

[21] Appl. No.: 696,752

[22] Filed: Aug. 14, 1996

[51] Int. Cl.⁶ ....................................................... G06F 3/00
[52] U.S. Cl. ............................................. 345/346; 345/352
[58] Field of Search ...................................... 345/326–358

[56] References Cited

U.S. PATENT DOCUMENTS

| 4,464,652 | 8/1984 | Lapson et al. | 340/710 |
| 5,001,654 | 3/1991 | Winiger et al. | 364/523 |

(List continued on next page.)

FOREIGN PATENT DOCUMENTS

| 2097540 | 12/1994 | Canada | G06F 012/06 |
| 0 587 394 A1 | 3/1994 | European Pat. Off. | G09G 3/36 |
| 0 622 728 A1 | 11/1994 | European Pat. Off. | G06F 9/44 |
| 04-361373 | 12/1992 | Japan | G06F 15/60 |
| 05-313845 | 11/1993 | Japan | G06F 3/14 |
| 06-4117 | 1/1994 | Japan | G06F 19/403 |
| 06-215095 | 8/1994 | Japan | G06F 15/62 |
| 07-129597 | 5/1995 | Japan | G06F 17/30 |

OTHER PUBLICATIONS

Advanced Interface Design Guide, IBM Corp., pp. 40–41, 46–47, 95–97, Jun. 1989.

Cowart, "Mastering WINDOWS 3.1", Sybex, pp. 189–193, 202, 899, 1993.

"Device Independent Graphics Using Dynamic Generic Operator Selection," *IBM Technical Disclosure Bulletin*, Apr. 1983, vol. 25, No. 11A, pp. 5477–5480.

"Error–Tolerant Dynamic Allocation of Command Processing Work Space," *IBM Technical Disclosure Bulletin*, Jun. 1984, vol. 27, No. 1B, pp. 584–586.

"Means for Computing the Max of a Set of Variables Distributed Across Many Processors," *IBM Technical Disclosure Bulletin*, Sep. 1990, vol. 33, No. 4, pp. 8–12.

"Graphical User Interface for the Distributed System Namespace," *IBM Technical Disclosure Bulletin*, Jul. 1992, vol. 35, No. 2, pp. 335–336.

"Graphical Query System," *IBM Technical Disclosure Bulletin*, Nov. 1993, vol. 36, No. 11, pp. 615–616.

"Configuration Data Set Build Batch Program," *IBM Technical Disclosure Bulletin*, Nov. 1993, vol. 36, No. 11, p. 571.

Self–Contained Reusable Programmed Components, *IBM Technical Disclosure Bulletin*, Jul. 1995, vol. 38, No. 7, pp. 283–285.

"IBM Printing Systems Manager for AIX Overview," *International Business Machines Corporation*, Second Edition, Feb. 1996.

(List continued on next page.)

*Primary Examiner*—John E. Breene
*Attorney, Agent, or Firm*—Merchant, Gould, Smith, Edell, Welter & Schmidt

[57] ABSTRACT

The invention is carried out in the following environment. The computer system has at least a visual operator interface, an operating system for operating applications within the computer system, and memory for storing at least part, preferably all, of an application. The present invention provides a method, apparatus, and application for constructing in a graphical user interface a list of values from pre-defined and user-defined values. Also disclosed is a means for adding, modifying, and deleting values. Additionally disclosed is a means for copying selected values from one entry to another entry in the list of values.

2 Claims, 12 Drawing Sheets

U.S. PATENT DOCUMENTS

| | | | |
|---|---|---|---|
| 5,062,060 | 10/1991 | Kolnick | 364/521 |
| 5,072,412 | 12/1991 | Henderson | 395/159 |
| 5,095,512 | 3/1992 | Roberts et al. | 382/56 |
| 5,117,372 | 5/1992 | Petty | 395/161 |
| 5,119,475 | 6/1992 | Smith et al. | 345/353 |
| 5,119,476 | 6/1992 | Texier | 395/157 |
| 5,121,477 | 6/1992 | Koopmans et al. | 395/156 |
| 5,140,677 | 8/1992 | Fleming et al. | 395/159 |
| 5,140,678 | 8/1992 | Torres | 395/159 |
| 5,164,911 | 11/1992 | Juran et al. | 364/578 |
| 5,206,950 | 4/1993 | Geary et al. | 395/600 |
| 5,208,907 | 5/1993 | Shelton et al. | 395/149 |
| 5,228,123 | 7/1993 | Heckel | 395/155 |
| 5,233,687 | 8/1993 | Henderson et al | 395/158 |
| 5,247,651 | 9/1993 | Clarisse et al. | 395/500 |
| 5,249,265 | 9/1993 | Liang | 395/160 |
| 5,255,359 | 10/1993 | Ebbers et al. | 395/161 |
| 5,276,795 | 1/1994 | Hoeber et al. | 345/353 |
| 5,276,901 | 1/1994 | Howell et al. | 395/800 |
| 5,287,447 | 2/1994 | Miller et al. | 395/157 |
| 5,287,514 | 2/1994 | Gram | 345/352 |
| 5,307,451 | 4/1994 | Clark | 395/127 |
| 5,315,703 | 5/1994 | Matheny et al. | 395/164 |
| 5,317,687 | 5/1994 | Torres | 395/159 |
| 5,345,550 | 9/1994 | Bloomfield | 345/353 |
| 5,353,219 | 10/1994 | Mueller et al. | 345/353 |
| 5,367,619 | 11/1994 | Dipaolo et al. | 395/149 |
| 5,371,844 | 12/1994 | Andrew et al. | 395/155 |
| 5,377,317 | 12/1994 | Bates et al. | 395/157 |
| 5,388,255 | 2/1995 | Pytlik et al. | 395/600 |
| 5,394,521 | 2/1995 | Henderson et al. | 395/158 |
| 5,404,439 | 4/1995 | Moran et al. | 395/155 |
| 5,410,695 | 4/1995 | Frey et al. | 395/650 |
| 5,410,704 | 4/1995 | Norden-Paul et al. | 395/700 |
| 5,412,776 | 5/1995 | Bloomfield et al. | 395/160 |
| 5,414,806 | 5/1995 | Richards | 395/135 |
| 5,416,900 | 5/1995 | Blanchard et al. | 395/155 |
| 5,418,950 | 5/1995 | Li et al. | 395/600 |
| 5,428,554 | 6/1995 | Laskoski | 364/550 |
| 5,428,776 | 6/1995 | Rothfield | 395/660 |
| 5,438,659 | 8/1995 | Notess et al. | 395/155 |
| 5,450,545 | 9/1995 | Martin et al. | 395/700 |
| 5,454,071 | 9/1995 | Siverbrook et al. | 395/141 |
| 5,454,106 | 9/1995 | Burns et al. | 395/600 |
| 5,459,825 | 10/1995 | Anderson et al. | 395/133 |
| 5,459,832 | 10/1995 | Wolf et al. | 395/155 |
| 5,463,724 | 10/1995 | Anderson et al. | 395/148 |
| 5,473,745 | 12/1995 | Berry et al. | 395/157 |
| 5,479,599 | 12/1995 | Rockwell et al. | 395/155 |
| 5,481,666 | 1/1996 | Nguyen et al. | 395/159 |
| 5,483,651 | 1/1996 | Adams et al. | 395/600 |
| 5,487,141 | 1/1996 | Cain et al. | 395/135 |
| 5,491,795 | 2/1996 | Beaudet et al. | 395/159 |
| 5,497,454 | 3/1996 | Bates et al. | 395/158 |
| 5,497,484 | 3/1996 | Potter et al. | 395/600 |
| 5,583,763 | 12/1996 | Atcheson et al. | 345/353 X |
| 5,608,860 | 3/1997 | Fitzpatrick et al. | 345/352 |
| 5,625,781 | 4/1997 | Cline et al. | 345/352 |

OTHER PUBLICATIONS

"IBM Printing Systems Manager for AIX Administrating," *International Business Machines Corporation*, 1995.

"Matching Three–Dimensional Objects Using a Relational Paradigm," *Pattern Recognition*, vol. 17, No. 4, pp. 385–405, 1984.

"A Multicolumn List–Box Container for OS/2," *Dr. Dobb's Journal*, May 1994, vol. 19, No. 5, pp. 90–94.

APPLICATION AND METHOD FOR CREATING A LIST FROM PRE-DEFINED AND USER VALUES

BACKGROUND OF THE INVENTION AND STATE OF THE PRIOR ART

1. Field of the Invention

The present invention relates to graphical user interfaces. More particularly, the invention relates to a method, apparatus and application for creating a list from pre-defined and user-defined values.

2. Description of Related Art

In order to better understand the terms utilized in this patent application, a brief background definition section will be presented so that the reader will have a common understanding of the terms employed and associated with the present invention.

A "user interface" is a group of techniques and mechanisms that a person employs to interact with an object. The user interface is developed to fit the needs or requirements of the users who use the object. Commonly known user interfaces can include telephone push buttons or dials, or pushbuttons such as on a VCR or a television set remote. With a computer, many interfaces not only allow the user to communicate with the computer but also allow the computer to communicate with the user. These would include (1) command-line user interfaces (i.e., user remembered commands which he/she enters, e.g. "C:>DIR" in which "DIR" is a typical DOS command entered at the "C" prompt); (2) menu-driven user interfaces which present an organized set of choices for the user, and (3) graphical user interfaces, ("GUI") in which the user points to and interacts with elements of the interface that are visible, for example by a "mouse" controlled arrow or cursor.

An example of a GUI user interface is that which is offered by International Business Machines Corporation (IBM) under the name "Common User Access" ("CUA"). This GUI incorporates elements of object orientation (i.e., the user's focus is on objects and the concept of applications is hidden). Object orientation of the interfaces allow for an interconnection of the working environment in which each element, called an "object," can interact with every other object. The objects users require to perform their tasks and the objects used by the operating environment can work cooperatively in one seamless interface. With object oriented programming using a GUI, the boundaries that distinguish applications from operating systems are no longer apparent or relevant to the user.

In connection with this patent application, an "object" means any visual component of a user interface that a user can work with as a unit, independent of other items, to perform a task. By way of example, a spreadsheet, one cell in a spreadsheet, a bar chart, one bar in a bar chart, a report, a paragraph in a report, a database, one record in a database, and a printer are all objects. Each object can be represented by one or more graphic images, called "icons," with which a user interacts, much as a user interacts with objects in the real world. (NOTE: In the real world, an object might be an item that a person requires to perform work. As an example, an architect's objects might include a scale, T-square, and a sharp pencil, while an accountant's objects might include a ledger and a calculator.) However, it is not required that an object always be represented by an icon, and not all interaction is accomplished by way of icons.

While classification of objects may follow many different definitions, each class of objects has a primary purpose that separates it from the other classes. A class may be looked at as a group of objects that have similar behavior and information structures. In addition, each of the objects enumerated and defined below may contain other objects. There are three primary classes of objects. Each is discussed below.

(1) Container Object: This object holds other objects. Its principal purpose is to provide the user with a way to hold or group related objects for easy access or retrieval. An operating system, e.g. OS/2® (a trademark of IBM Corporation) or Windows® (a trademark of Microsoft Corporation), typically provides a general-purpose container, for example a folder or a program group—that holds any type of object, including other containers. For example, imagine a program group (or folder) labeled "PRIVATE FOLDER—ICONS". In the program group are three folder icons labeled "REPORTS", "PORTFOLIO" and "LETTERS". By selecting with a mouse or other pointing device the icon "PORTFOLIO", another window may open showing three more icons labeled "OIL PAINTINGS", "WATERCOLORS", and "PORTRAITS". In turn, selecting any of those three icons may open additional windows with further icons representing further subdivisions, or cross-references (e.g., "CUSTOMERS").

(2) Data Objects: The principal purpose of a data object is to convey information. This information may be textual or graphical information or even audio or video information. For example, a business report displayed on the computer monitor may contain textual information concerning sales of "gadgets" over the past few years (text object) to all customers and also may contain a bar chart (graphic object) to pictorially depict, on the same monitor screen, the sales information.

(3) Device Objects: The principal purpose of a device object is to provide a communication vehicle between the computer and another physical or logical object. Many times the device object represents a physical object in the real world. For example, a mouse object or icon can represent the user's pointing device, and a modem object can represent the user's modem, or a printer object or icon can represent the user's printer. Other device objects are purely logical, e.g. an out-basket icon representing outgoing electronic mail; a wastebasket object or icon representing a way the user may "trash" or dispose of other objects.

As can be seen from the foregoing, a class of objects may be defined as a description of the common characteristics of several objects, or a template or model which represents how the objects contained in the class are structured. While there are further ways in which to define objects and classes of objects, typically each class of objects will include similar attributes, the values of which the user will alter, modify, replace or remove from time to time. For a more complete discussion of objects, attributes, object oriented interfaces etc. see "Object Oriented Interface Design: IBM Common User Access" (published by Que, ISBN 1-56529-170-0).

The present invention relates primarily to data objects. In a graphical user interface, the user frequently desires to construct a list of values. The values may be pre-defined or may be defined by the user. In addition to creating the list, the user typically wants to modify the list, once created, by adding, deleting, or modifying values. Moreover, it is useful for the user to be able to copy values from one entry to another.

There are no standard solutions to these needs in the field of graphical user interfaces. Of course a variety of database products exist that provide various data management options. However, within graphical user interfaces there are no known solutions that adequately meet user needs.

SUMMARY OF THE INVENTION

In view of the above, it is a principal object of the present invention to provide a graphically oriented method, application and apparatus to construct and modify a list of values, whether the values are pre-defined or user-defined.

Another object of the present invention is to permit the user to add values to and delete values from a list by selecting and deselecting pre-defined values.

Another object of the present invention is to permit the user to add a user-defined value to a list.

Another object of the present invention is to allow the user to copy a value from a list, modify the value, and insert the modified value into the list while also retaining the original value in the list.

Yet another object of the present invention is to allow the user to copy a value from a list, modify the value, and replace the original value with the modified value in the list.

Still another object of the present invention is to allow the user to delete a value from a list.

The invention is carried out in the following environment. The computer system has at least a visual operator interface, an operating system for operating applications within the computer system, and memory for storing at least part, preferably all, of an application. The present invention provides a method, apparatus, and application for constructing in a graphical user interface a list of values, whether the values are pre-defined or user-defined. Also disclosed is a means for adding, modifying, and deleting values. Additionally disclosed is a means for copying selected values, modifying the selected values, and inserting the modified values into the list, while also retaining the original value in the list.

Other objects of the invention and a more complete understanding of the invention may be had by referring to the following description taken in conjunction with the accompanying drawings.

DESCRIPTION OF THE ILLUSTRATIVE EMBODIMENT(S)

Figure 1:
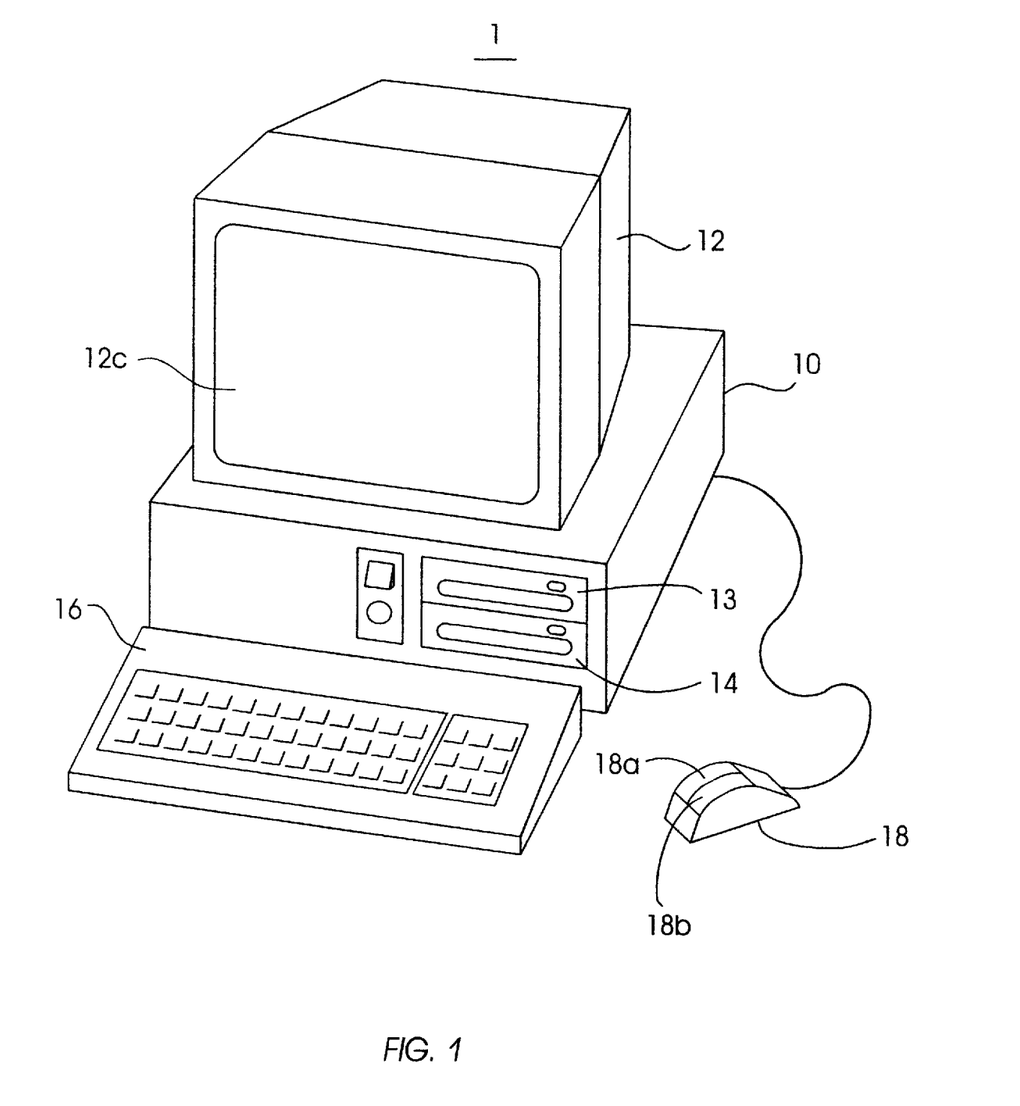
FIG. 1 illustrates a typical desktop computer system which may be employed to practice the novel method and application of the present invention.
Figure 2:
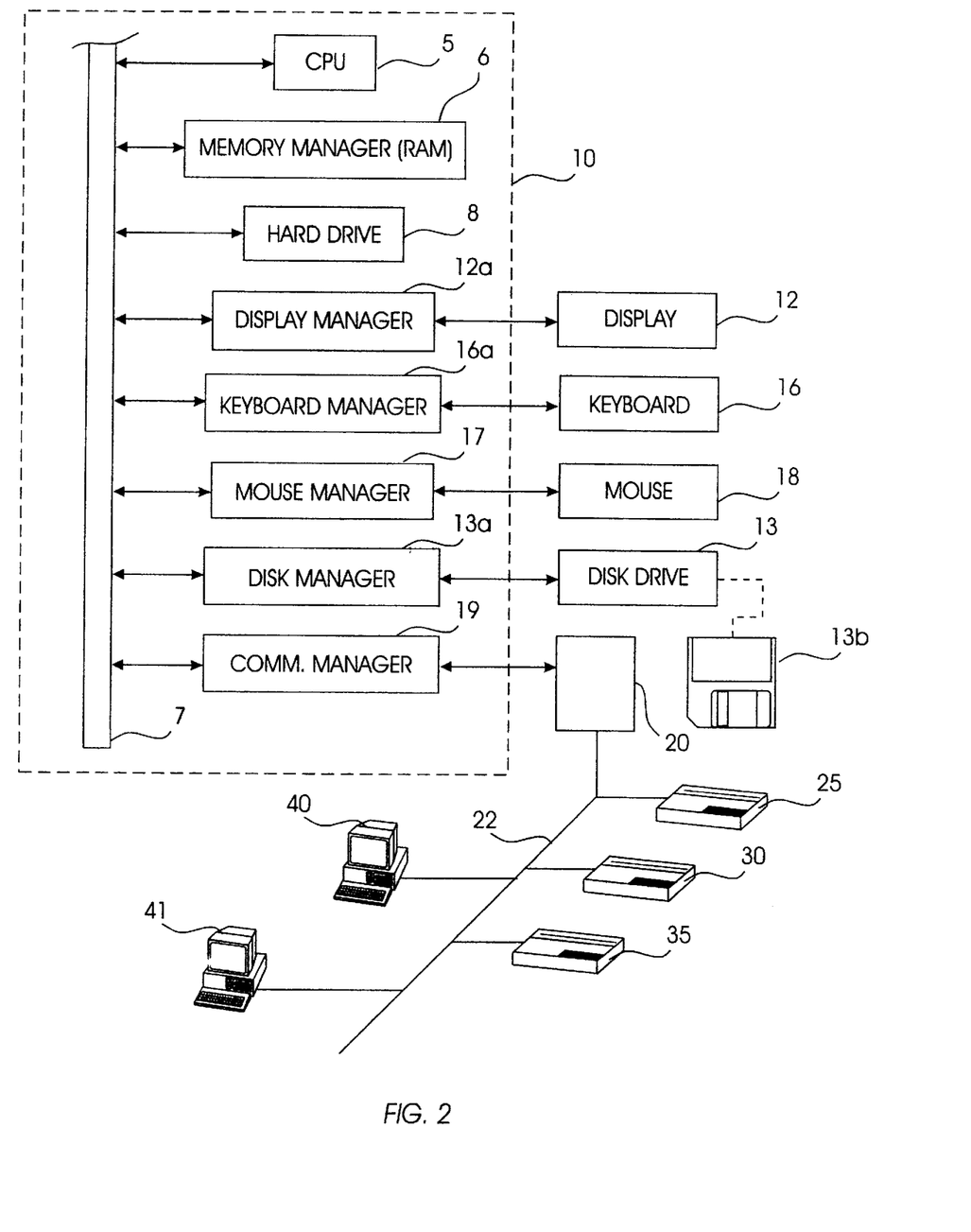
FIG. 2 is a block diagram illustrating a sample configuration of the computer system shown in FIG. 1.

Turning now to the drawings, and especially FIGS. 1 and 2, FIG. 1 diagrammatically shows a computer system 1 which may be connected to a Local Area Network system (LAN 20) as shown in FIG. 2.

As shown in FIG. 1, the computer system 1 comprises a main chassis 10, a display means or monitor 12, a connected keyboard 16 and a pointing device, in the present instance a mouse 18 which is operator controlled to move a pointer cursor 12b (shown in FIG. 3) on the display or monitor screen 12c. As shown in FIG. 2, the chassis 10 includes a central processing unit, or "CPU" 5, a memory manager and associated random access memory, or "RAM" 6, a fixed disk or hard drive 8 (which may include its associated disk controller), a display manager 12a which is connected externally to the chassis 10 of the display 12; a keyboard manager 16a, which through flexible cable (not shown) is connected to the keyboard 16; a mouse manager 17 (which in some instances may form part of the display manager 12a, and may be in the form of a software driver) for reading the motion of the mouse 18 and its control mouse buttons (MB) 18a and 18b, shown in FIG. 1. A disk manager or controller 13a which controls the action of the disk drive 13 (and an optional drive such as a magneto-optical or CD ROM drive 14) shown in FIG. 1, rounds out most of the major elements of the computer system 1.

The pointer element or cursor 12b can be moved over the display screen 12c by movement of the mouse 18. The mouse buttons (MB) 18a and 18b give commands to the operating system, usually through a software mouse driver provided by the mouse manufacturer. With the first mouse button (MB) 18a the operator can select an element indicated on the display screen 12c using the pointer or cursor 12b, i.e., signify that an action subsequently to be performed is to be carried out on the data represented by the indicated element on the display screen 12c. The system normally gives some visual feedback to the operator to indicate the element selected, such as a change in color, or a blocking of the icon. The second mouse button (MB) 18b may be a menu button, if desired. Conventionally, when the operator presses button 18b, a selection menu or dialog with system commands will appear on the display screen 12c. The operator may select an icon or item from the selection menu or input information into the dialog box as appropriate using the cursor 12b and the first mouse button (MB) 18a. Some menu items, if selected, may call up another menu or submenu for the operator to continue the selection process.

The use of a mouse and selection menus is well known in the art, for example U.S. Pat. No. 4,464,652 to Lapson et al. describes a selection menu of the pull-down type in combination with a mouse. It should be recognized, of course, that other cursor pointing devices may be employed, for example a joystick, ball and socket, or cursor keys on the keyboard.

The foregoing devices (and software drivers therefore) within the chassis 10 communicate with one another via a bus 7. To round out the computer system 1, an operating system (not shown) must be employed. If the computer system is a typical IBM-based system, the operating system may be DOS-based and include a GUI interface such as contained in OS/2®, or WINDOWS®, or other operating system of choice. If the computer system is based upon RISC (reduced instruction set computer) architecture, then the operating system employed may be, in the instance of an IBM-based RISC architectured System/6000®, AIX. Alternatively, if the computer system 1 is a large host computer, such as a an IBM 3090, it may be running an operating system such as MVS or VM.

In the illustrated instance, the computer system 1 includes an I/O (Input/Output) manager or communications manager 19 (shown in FIG. 2) which serves to link the computer system for communications with the outside world such as to a systems printer, a modem or a LAN controller (such as a Token ring or ETHERNET or even through a modem employing SDLC) such as shown at 20 in FIG. 2. The LAN controller may be incorporated inside the computer system 1 or located externally as shown diagrammatically in FIG. 2, as desired. The LAN controller 20 may connect to other computer systems 40 and 41 as well as to other printers such as printers 25, 30 and 35 by communications cable 22 and the like. However the method and application of the present invention works equally well with multiple objects serviced by a single computer system.

Figure 3:
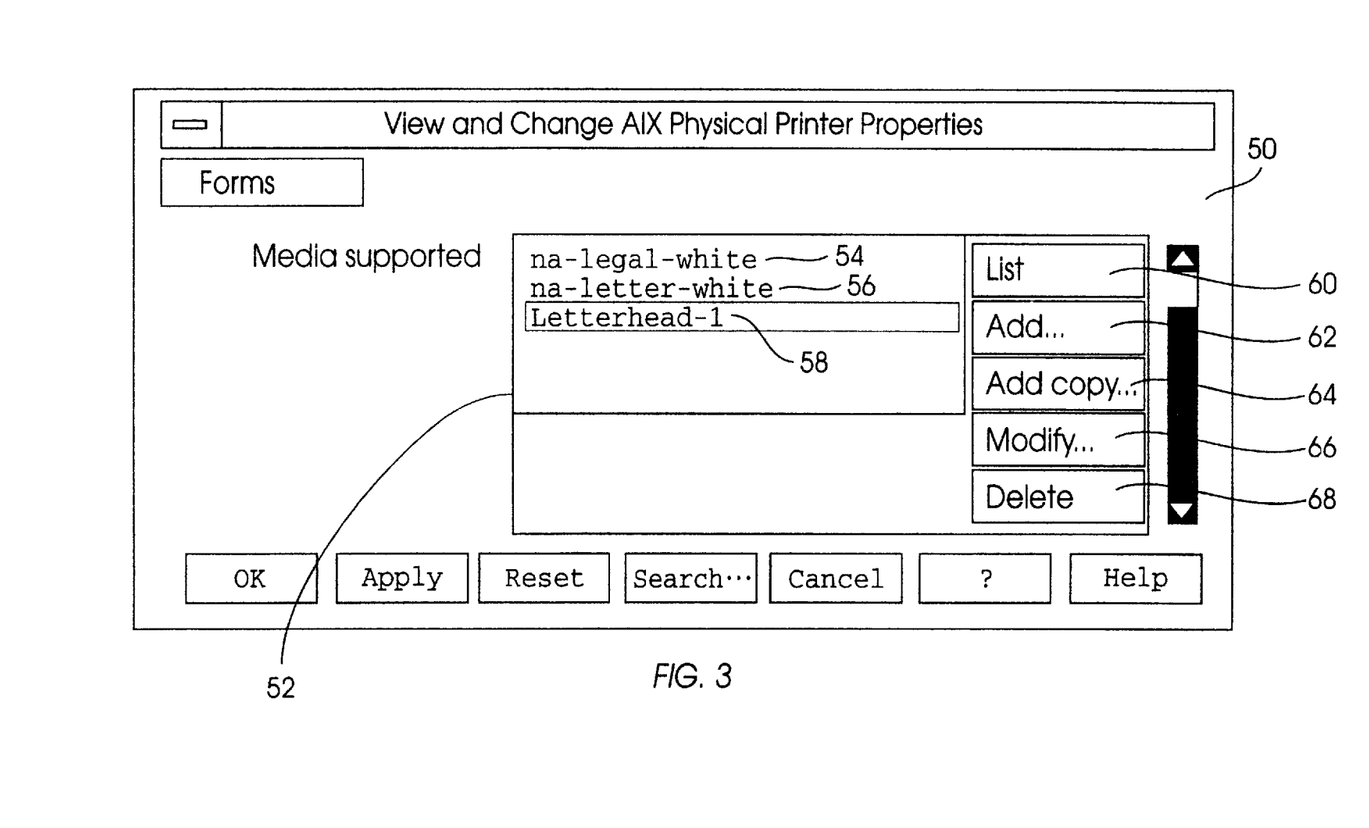
FIG. 3 is a typical window, in accordance with the present invention, showing a list of values in a user-list box.

Referring now to FIG. 3, the display screen 12c of the monitor 12 is shown with a window 50. As illustrated, a user-list box 52 contains three values, 54, 56 and 58. Value 54 is one value in the user-list box 52.

The values shown in FIG. 3, are na-legal-white 54, na-letter-white 56, and Letterhead-1 58. In this example, na-legal-white 54 and na-letter-white 56 are pre-defined values, while Letterhead-1 58 is a user-defined value. Down the right hand side of window 50 are five pushbuttons 60, 62, 64, 66 and 68. The List Pushbutton 60 is selected to display a list of pre-defined values which can then be selected and/or deselected. The Add Pushbutton 62 is selected to add a user-defined value to the user-list box 52. The Add Copy Pushbutton 64 is selected to copy a value from the user-list box 52 to create another entry in the user-list box 52. The Modify Pushbutton 66 is selected to modify an existing value in the user-list box 52. The Delete Pushbutton 68 is selected to delete an existing value in the user-list box 52. The operation of each of these pushbuttons is described in further detail below.

Figure 4:
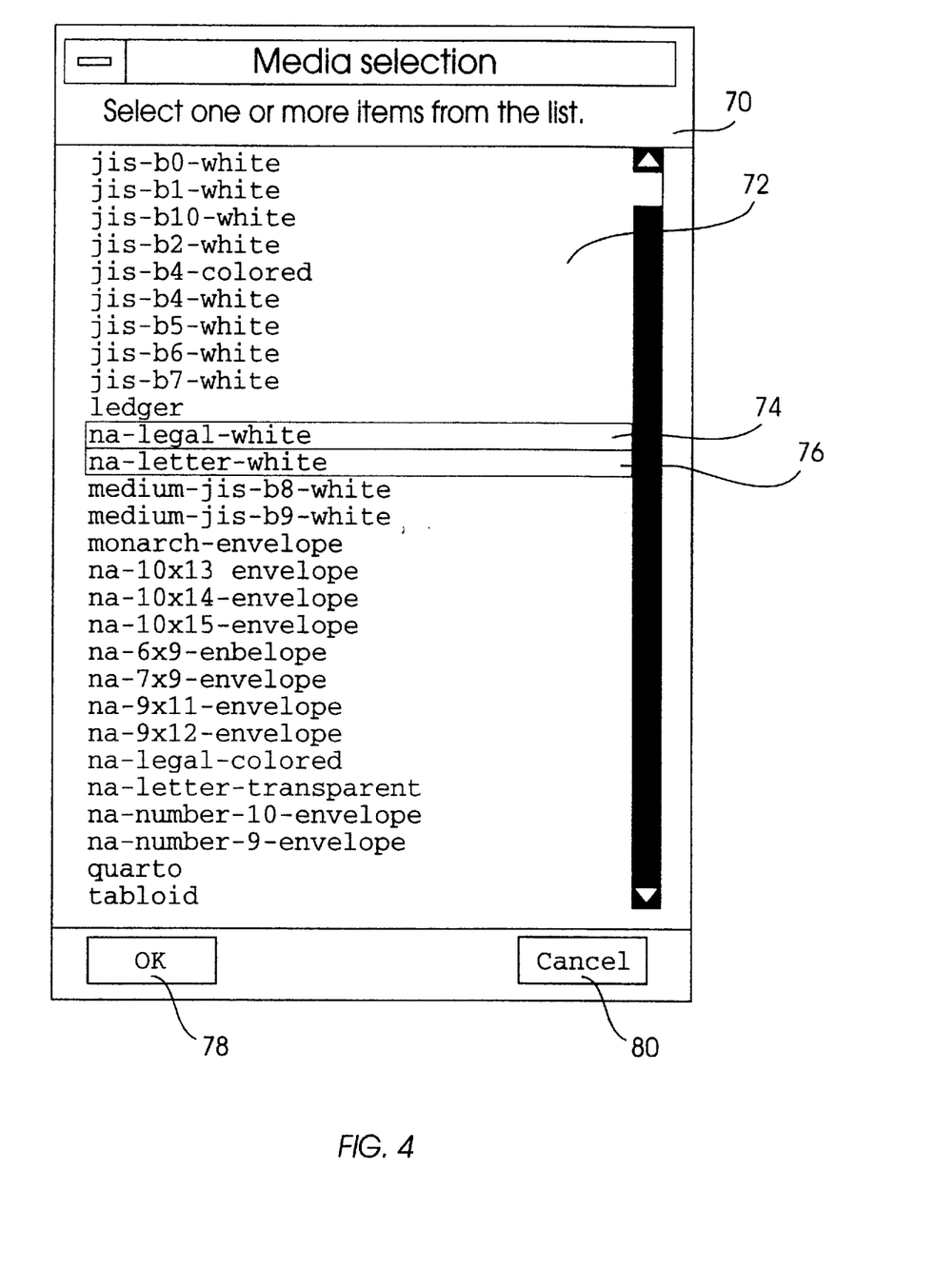
FIG. 4 is a typical window showing how pre-defined values are selected for the list of values in the user-list box.

FIG. 4 shows a typical window 70 to demonstrate how pre-defined values are added to and deleted from the user-list box 52. When the user selects the List Pushbutton 60 in the window 50 in FIG. 3, the window 70 appears. The window 70 lists pre-defined values 72 which may be selected and deselected so as to add and delete the pre-defined values from the user-list box 52. Note that in this example there are two pre-defined values, na-legal-white 74 and na-letter-white 76, which are highlighted in the pre-defined value list 72. The highlighting indicates that these pre-defined values are currently in the user-defined list box 52 in FIG. 3. The user may select additional pre-defined values to be added to the user-list box 52, or may deselect values currently in the user-list box 52, which will remove these pre-defined values from the user-list box 52. When the user is done selecting and deselecting pre-defined values, the user selects the OK Pushbutton 78. The Cancel Pushbutton 80 may also be used to return to the user-list box 52 without making any changes.

Figure 5:
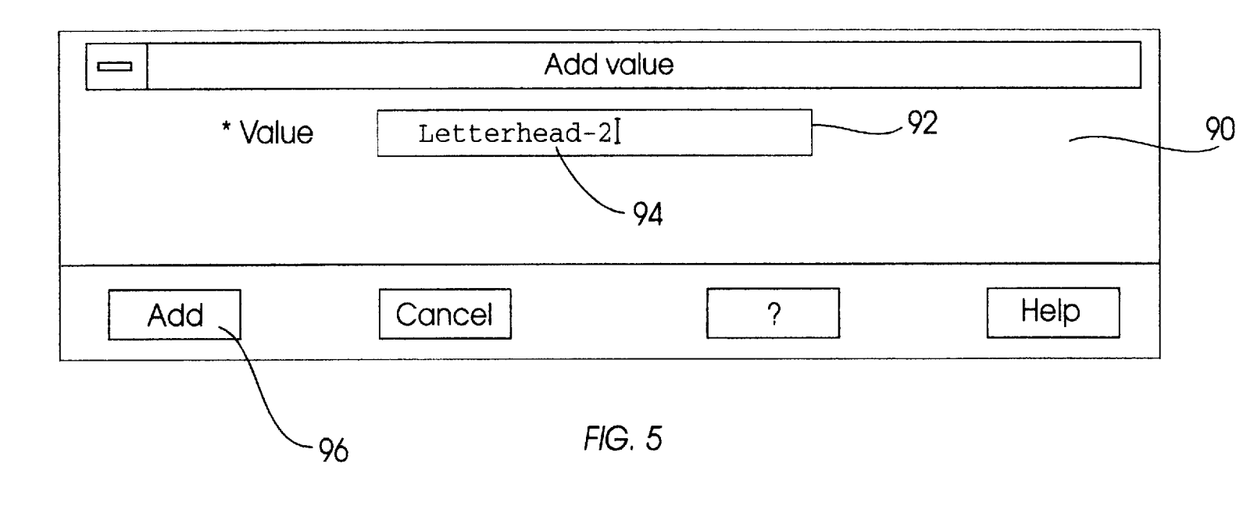
FIG. 5 is a typical window showing how user-defined values are added to the list of values in the user-list box.
Figure 6:
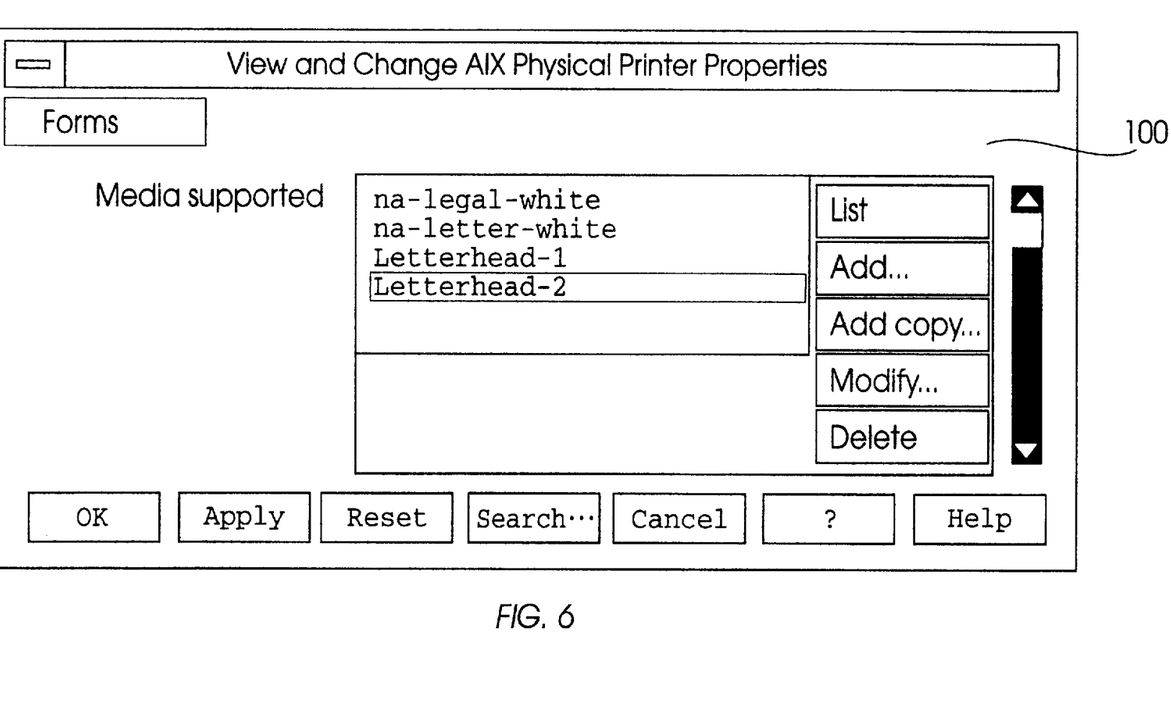
FIG. 6 is a typical window showing the added user-defined value in the user-list box.

FIG. 5 shows a typical window 90 to demonstrate how user-defined values are added to the user-list box 52. When the user selects the Add Pushbutton 62 in the window 50 in FIG. 3, the window 90 appears. The window 90 contains a Value Box 92. To add a user-defined value to the user-list box 52, the user enters the value to be added. In this example, the user-defined value to be added is Letterhead-2 94. The user then selects the Add Pushbutton 96 at the bottom of window 90. The window 90 then closes and, as shown in FIG. 6, the window 100 appears. Window 100 is identical to window 50, except that the user-defined value 102 added in window 90 is shown in the user-list box 52.

Figure 7:
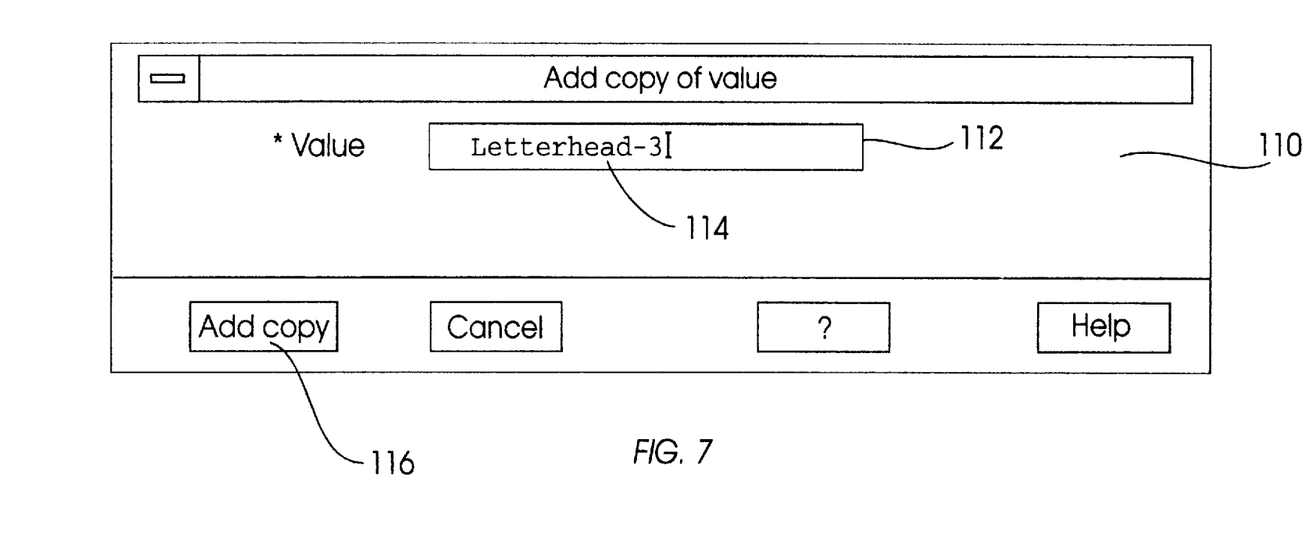
FIG. 7 is a typical window showing the copying of a value already in the user-list box, and then modification of the copy.

Assume now that the user desires to copy value 102 to create a fifth entry in user-list box 52. The user selects Add Copy Pushbutton 64. This causes window 110 to appear, as shown in FIG. 7. The value 102, from FIG. 6, is "pre-filled in" to the Value Box 112 on window 110. If the user then desires to make certain modifications to the value 102, this can be done without the user having to re-enter all of the information for the value 102.

Figure 8:
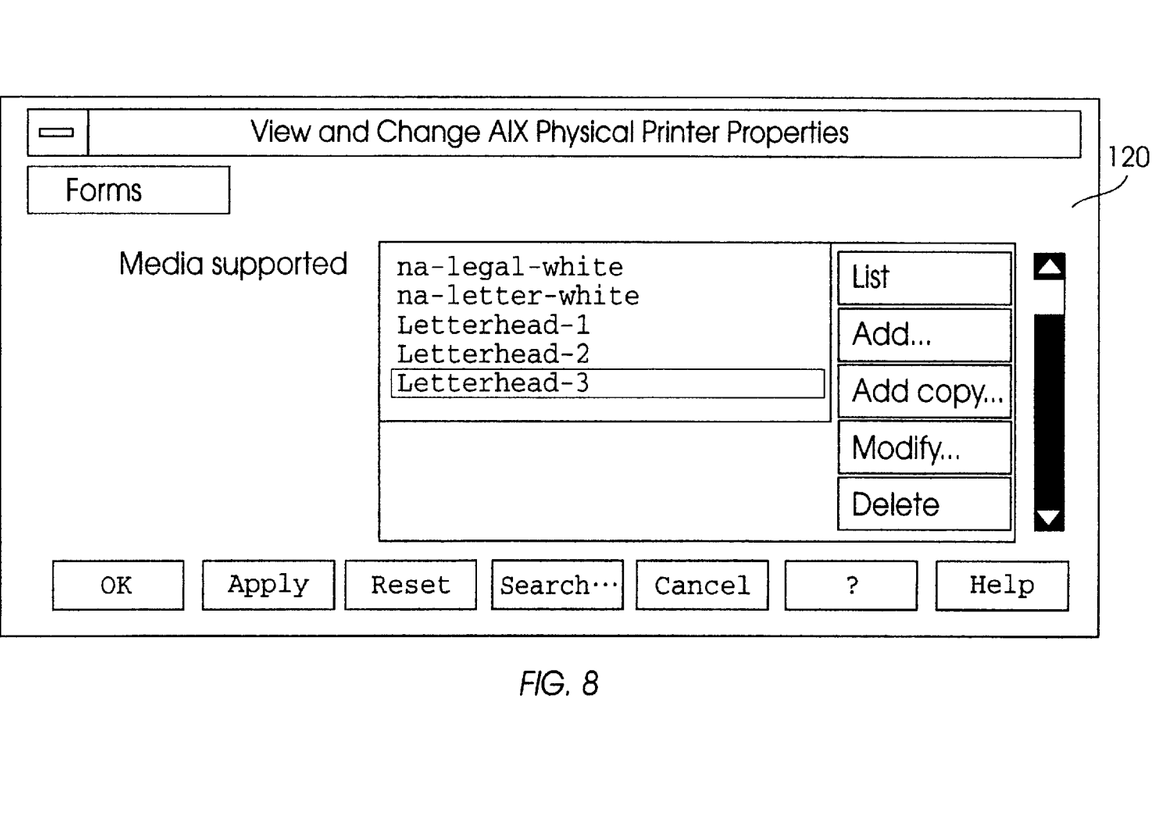
FIG. 8 is a typical window showing the added copy, as modified, in the user-list box.

In this example, the user changed the value Letterhead-2 to Letterhead-3 114. When the modifications are complete, the user selects the Add Copy Pushbutton 116. This causes window 120 to appear, as shown in FIG. 8. As shown in FIG. 8, the new value 122 has been added to the user-list box 52. Note that both the original value and the modified value now appear in the user-list box.

Figure 9:
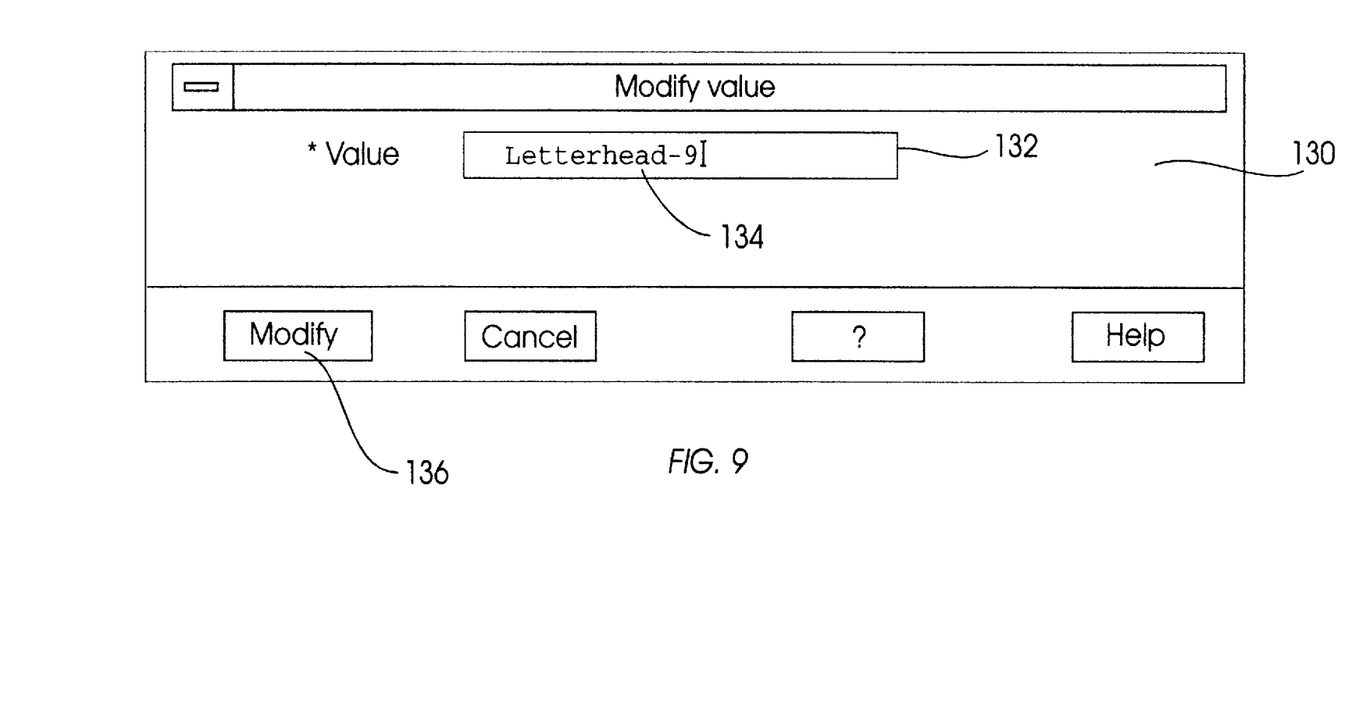
FIG. 9 is a typical window showing the modification of an existing value in the user-list box.

Now suppose the user desires to modify value 122. The user selects the Modify Pushbutton 66. This causes the window 130 shown in FIG. 9 to appear. Window 130 contains a Value Box 132 which is "pre-filled-in" with the information for value 122 showing in the user-list box 52 and as previously entered by the user. The user can make minor changes to the user-defined value 134 as shown in FIG. 9. In this example, the user changed Letterhead-3 to Letterhead-9 134. Of course, other modifications are also possible. The modifications shown are examples only.

Figure 10:
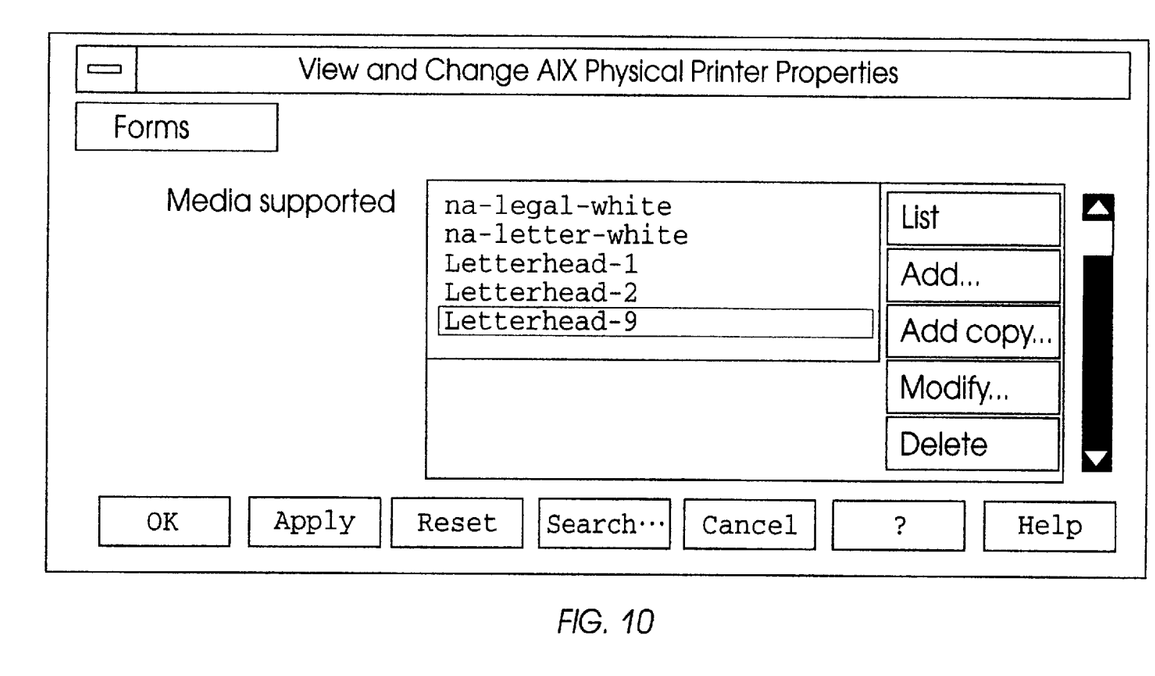
FIG. 10 is a typical window showing the modified value in the user-list box.

When the modifications are complete, the user selects the Modify Pushbutton 136 as shown in FIG. 9. FIG. 10 shows user-list box 52 with value 134 modified as shown in FIG. 9. Note that when modifying a user-defined value, only the modified value appears in the user-list box.

Although not illustrated in the Figures, the user also can delete a value in the user-list box 52. To delete a value, the Delete Pushbutton 68 is selected.

Figure 11A:
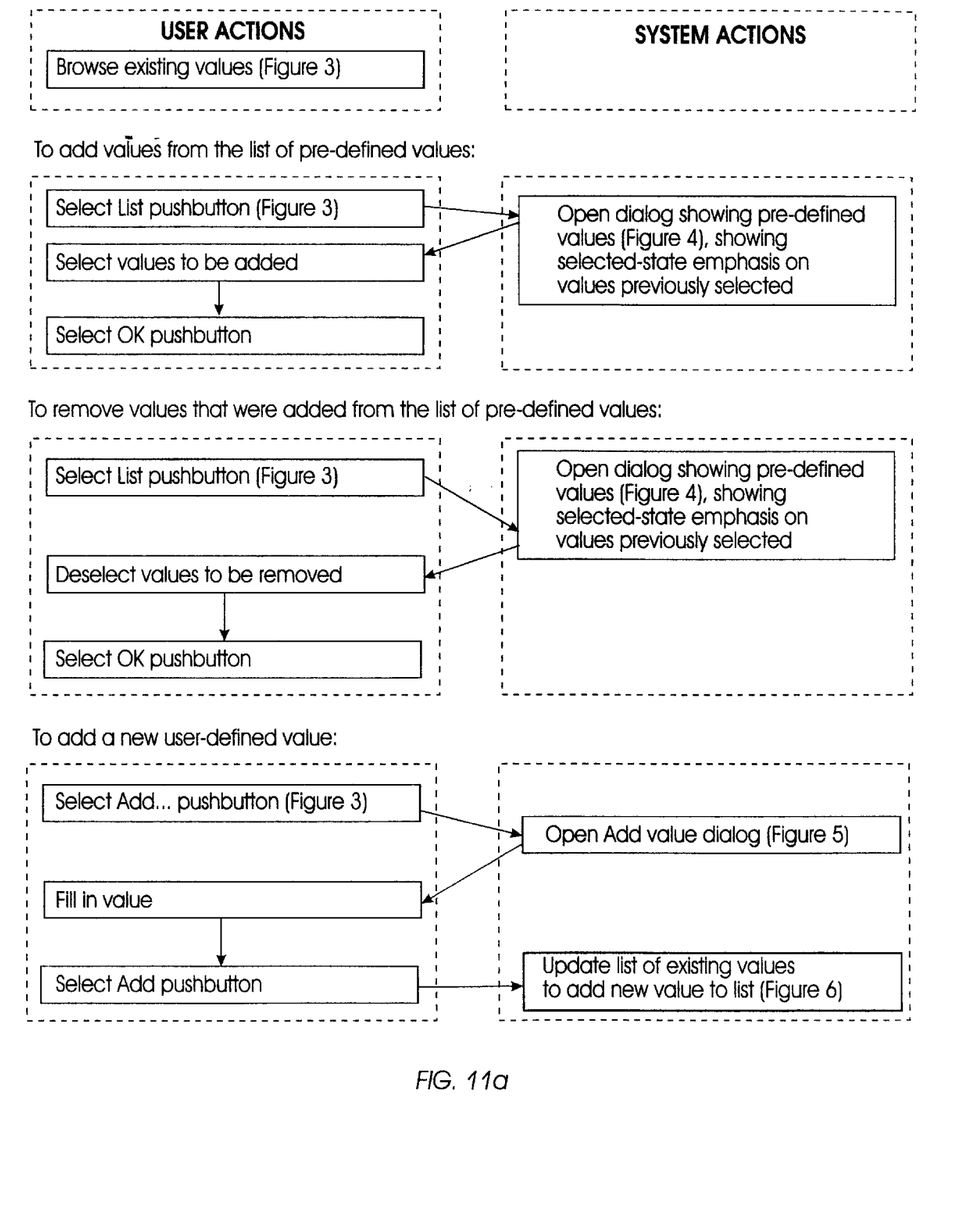
FIG. 11 is a flow chart illustrating the method of the present invention, including FIG. 11A and FIG. 11B.
Figure 11B:
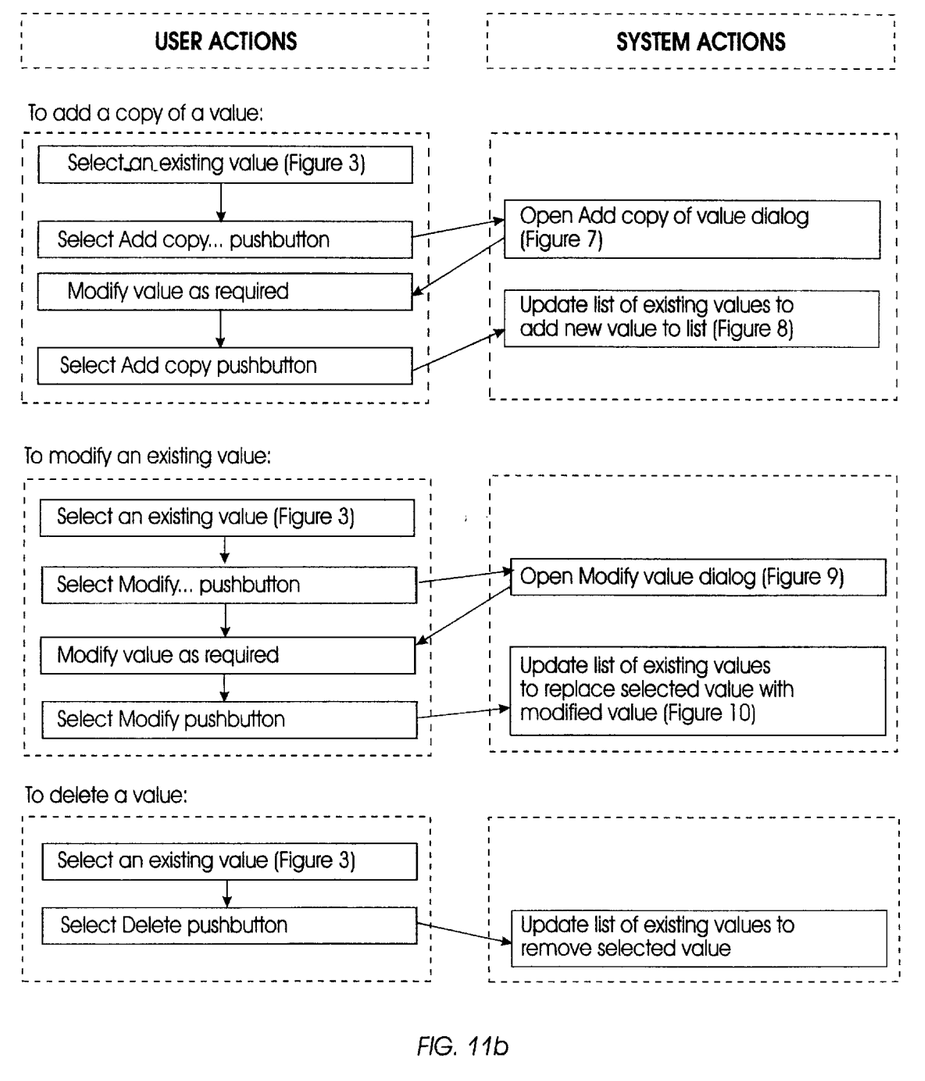

FIG. 11 shows the method of the present invention.

Although the invention has been described with a certain degree of particularity, it should be recognized that elements thereof may be altered by person(s) skilled in the art without departing from the spirit and scope of the invention. The invention is limited only by the following claims and their equivalents.

What is claimed is:

1. An application for creating a user-list of values, as controlled by a computer system having at least a visual operator interface, an operating system for controlling the operation of program applications within the computer system, and memory for storing a program application, the application comprising:

means for selecting a first window showing a user-list box that contains a user-list of values;

means for selecting a list pushbutton to view a second window that contains a list of pre-defined values, wherein values currently in said user-list of values are indicated;

means for selecting one or more of said pre-defined values to be added to said user-list of values;

means for deselecting said indicated values to be deleted from said user-list of values; and     means for displaying said user-list of values containing the added pre-defined values and not containing the deleted pre-defined values.

2. A method for creating a user-list of values, as controlled by a computer system having at least a visual operator interface, an operating system for controlling the operation of program applications within the computer system, and memory for storing a program application, the application comprising:

selecting a first window showing a user-list box that contains a user-list of values;

selecting a list pushbutton to view a second window that contains a list of pre-defined values, wherein values currently in said user-list of values are indicated;

selecting one or more of said pre-defined values to be added to said user-list of values;

deselecting said indicated values to be deleted from said user-list of values; and     displaying said user-list of values containing the added pre-defined values and not containing the deleted pre-defined values.

\* \* \* \* \*